United States Patent
Bergmeier

(10) Patent No.: US 11,518,626 B2
(45) Date of Patent: Dec. 6, 2022

(54) TRANSFER DEVICE FOR TRANSFERRING EGGS AND DEVICE FOR TRANSPORTING AND PACKAGING EGGS

(71) Applicant: Gerd Bergmeier, Hiddenhausen (DE)

(72) Inventor: Gerd Bergmeier, Hiddenhausen (DE)

( * ) Notice: Subject to any disclaimer, the term of this patent is extended or adjusted under 35 U.S.C. 154(b) by 97 days.

(21) Appl. No.: 16/623,887

(22) PCT Filed: Jun. 5, 2018

(86) PCT No.: PCT/EP2018/064748
§ 371 (c)(1),
(2) Date: Dec. 18, 2019

(87) PCT Pub. No.: WO2018/234031
PCT Pub. Date: Dec. 27, 2018

(65) Prior Publication Data
US 2021/0094767 A1    Apr. 1, 2021

(30) Foreign Application Priority Data

Jun. 19, 2017   (DE) .................... 10 2017 113 410.7

(51) Int. Cl.
*B65B 5/06*       (2006.01)
*B65B 23/08*      (2006.01)
(Continued)

(52) U.S. Cl.
CPC ........ *B65G 47/918* (2013.01); *B25J 15/0061* (2013.01); *B65B 5/068* (2013.01);
(Continued)

(58) Field of Classification Search
CPC .......... B65G 47/918; B65G 2201/0208; B65G 2207/08; B65G 47/244; B25J 15/0061;
(Continued)

(56) References Cited

U.S. PATENT DOCUMENTS 3,062,578 A * 11/1962 Bushong ................. B65B 23/08
                                                    294/65
3,230,001 A *  1/1966 Hirt ........................ B65B 23/08
                                                    294/184

(Continued)

FOREIGN PATENT DOCUMENTS

| EP | 0768254 A1 | 4/1997 |
|---|---|---|
| ES | 2351466 A1 | 2/2011 |
| JP | 2000247306 A | 9/2000 |

OTHER PUBLICATIONS

International Search Report dated Sep. 4, 2018 in related International Application No. PCT/EP2018/064748.
(Continued)

*Primary Examiner* — Thomas M Wittenschlaeger
*Assistant Examiner* — Katie L Gerth
(74) *Attorney, Agent, or Firm* — Patent Portfolio Builders PLLC

(57) ABSTRACT

A transfer device for transferring eggs from a conveyor belt to egg packaging, the transfer device includes a frame with at least one mounting plate of a mounting element, on which mounting plate a plurality of suction lifting elements that can be connected to a suction apparatus are mounted. The suction lifting elements are mounted on the mounting plate so as to be movable in the plane of the mounting plate by motorized or hydraulic means between a suction position and a release position.

12 Claims, 7 Drawing Sheets

Figure 1:
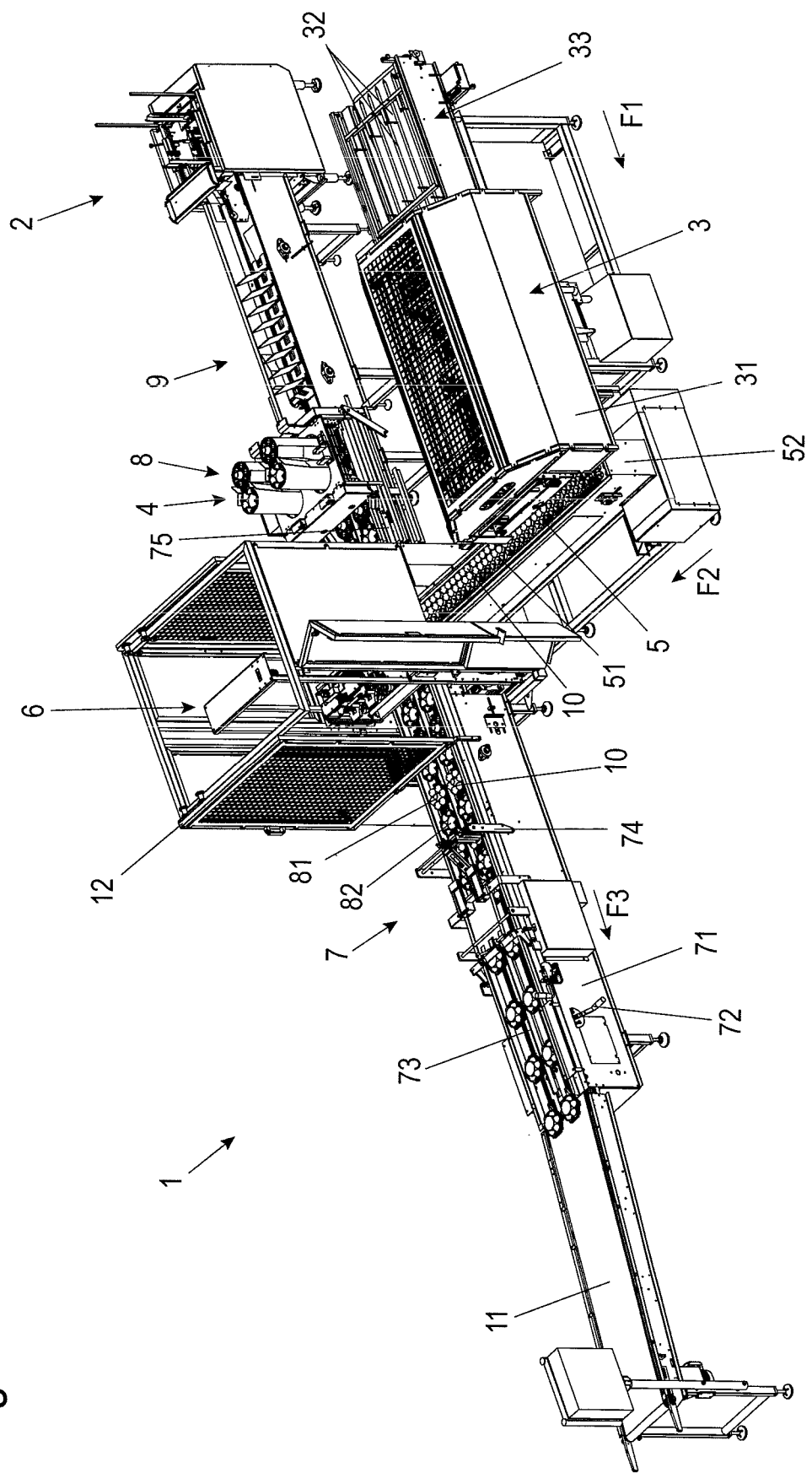

(51) Int. Cl.
 *B65B 35/18*  (2006.01)
 *B65B 35/58*  (2006.01)
 *B65B 5/08*  (2006.01)
 *B65G 47/91*  (2006.01)
 *B25J 15/00*  (2006.01)

(52) U.S. Cl.
 CPC ............... *B65B 5/08* (2013.01); *B65B 23/08* (2013.01); *B65B 35/18* (2013.01); *B65B 35/58* (2013.01); *B65G 2201/0208* (2013.01); *B65G 2207/08* (2013.01)

(58) Field of Classification Search
 CPC ...... B25J 15/0616; B65B 5/068; B65B 23/08; B65B 35/18; B65B 35/58; B65B 5/08
 See application file for complete search history.

(56) References Cited

U.S. PATENT DOCUMENTS

| | | | | |
|---|---|---|---|---|
| 4,411,574 A | * | 10/1983 | Riley | B65B 21/20 198/432 |
| 5,112,181 A | * | 5/1992 | Rasmussen | B65B 23/08 294/2 |
| 5,273,152 A | * | 12/1993 | Brun | B29C 49/4215 198/468.3 |
| 5,743,068 A | * | 4/1998 | Madariaga | B65B 5/08 53/247 |
| 5,931,279 A | * | 8/1999 | Pedrotto | B65G 47/918 198/468.3 |
| 8,454,067 B2 | * | 6/2013 | Weaver | B65B 21/06 294/87.1 |
| 2003/0056729 A1 | * | 3/2003 | Correa | A01K 45/007 119/6.8 |
| 2013/0266413 A1 | * | 10/2013 | Bergmeier | B65B 23/08 414/788.8 |
| 2014/0255141 A1 | * | 9/2014 | Koure | B65G 47/90 414/796.2 |
| 2018/0105379 A1 | * | 4/2018 | Knook | B65G 59/10 |

OTHER PUBLICATIONS

Written Opinion dated Sep. 4, 2018 in related International Application No. PCT/EP2018/064748.

\* cited by examiner

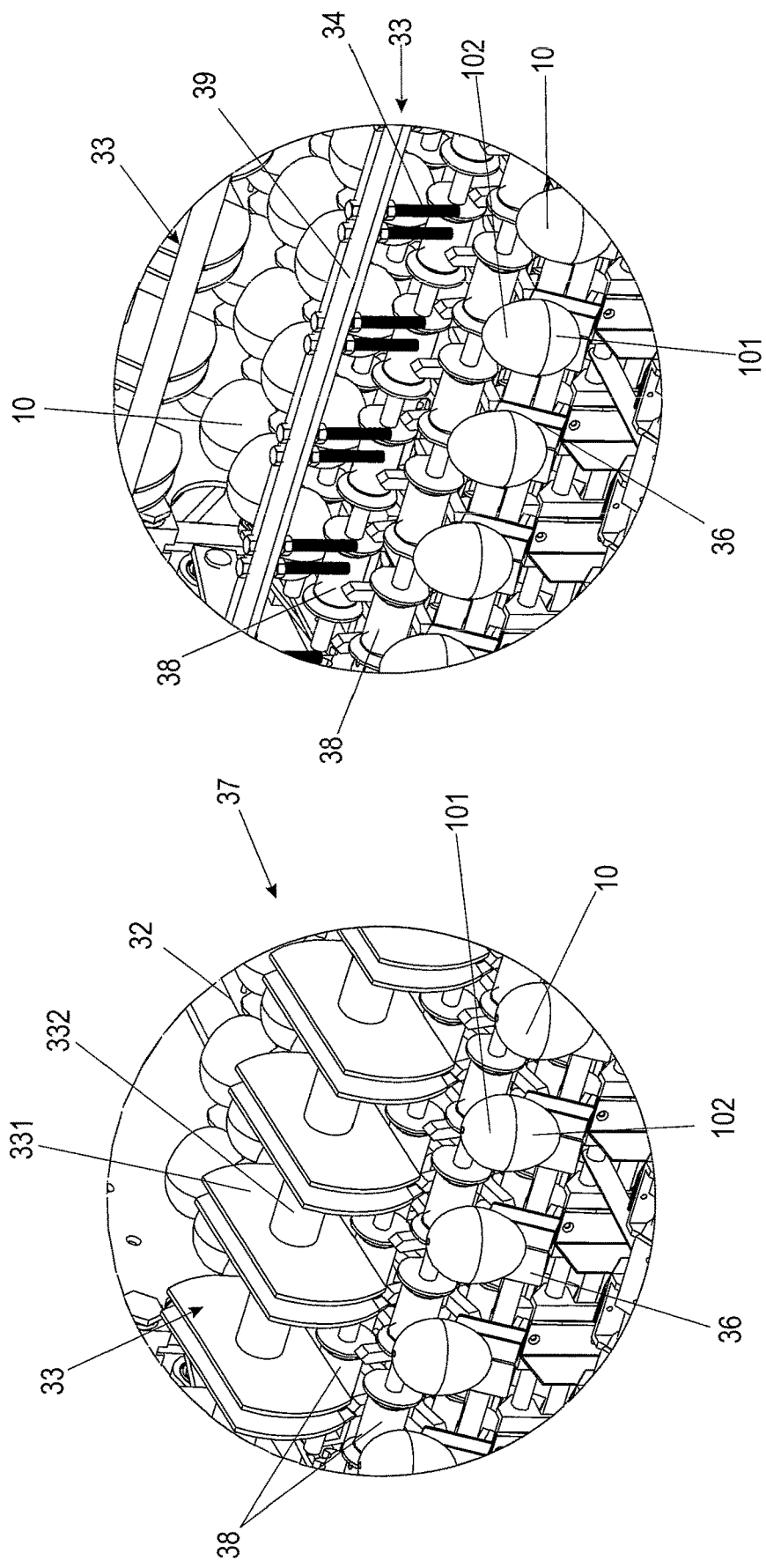

TRANSFER DEVICE FOR TRANSFERRING EGGS AND DEVICE FOR TRANSPORTING AND PACKAGING EGGS

BACKGROUND AND SUMMARY OF THE INVENTION

Exemplary embodiments of the present invention are directed to a transfer device for transferring eggs and a device for transporting and packaging eggs.

Such transfer devices are required to transfer eggs from a conveyor belt to an egg pack. For the gentle and reliable lifting of eggs, it is known that the eggs are attached to a mounting plate using so-called suction lifting elements connected to a suction device such, as a vacuum pump in an arrangement of, for example, six suction lifting elements. The mounting plate can be pivoted from a position where the suction lifting elements are positioned above the conveyor belt to a position where the mounting plate is positioned above the egg pack so that by removing the vacuum in the suction elements the eggs can be transferred to the egg pack. The egg pack filled in this way is then closed and fed to a collecting belt for further packaging.

The problem with the well-known transfer devices in such transport and packaging devices for eggs is that different transfer devices have to be used for different egg packs.

Exemplary embodiments of the present invention are directed to a transfer device for transferring eggs and a device for transporting and packaging eggs that can be used to fill a large number of egg packs without replacing the transfer device.

The transfer device according to the invention for transferring eggs from a conveyor belt to an egg pack comprises a frame with at least one mounting plate of a mounting element on which a plurality of suction lifting elements connectable to a suction device are mounted. The suction lifting elements are mounted on the mounting plate in the plane of the mounting plate so that they can be moved hydraulically or motor-driven between a suction position and a discharge position.

This makes it possible to position the group of suction lifting elements mounted on such a mounting plate in different positions relative to each other such that, for example, double-row egg packs as well as so-called star packs for eggs can be loaded.

In accordance with an advantageous embodiment variant, six suction lifting elements are mounted on the mounting plate, wherein two of the suction lifting elements can be moved linearly in a first displacement direction and the other four of the suction lifting elements can be moved linearly in a second displacement direction.

This allows a simple displacement of the suction lifting elements from an arrangement of the suction lifting elements in two rows to a star-shaped arrangement of the suction lifting elements.

According to another advantageous embodiment variant, the mounting plate has guide recesses to accommodate guide parts of the suction lifting elements, in which the guide parts are displaceably guided.

This ensures exact guidance of the suction lifting elements when they are moved.

Each of the suction lifting elements has a suction cup, a piece of hose or pipe that opens into an upper end of the suction cup and a guide part connected to an adjusting mechanism in accordance with an advantageous embodiment variant.

This makes it possible to move each of the suction lifting elements between two or more different positions.

According to another preferred embodiment variant of the transfer device according to the invention, two mounting elements are mounted next to each other on the frame.

This enables a further acceleration of the transfer process, in which two egg packs can be loaded simultaneously or alternatively an egg pack can be loaded with a larger number of egg pick-up points.

In order to further facilitate loading or unloading arrangements of the suction lifting elements, at least one of the mounting elements can be pivoted about a rotary axis perpendicular to the mounting elements.

The device for transporting and packaging eggs in egg packs comprises at least one destacking station for empty egg packs, an egg alignment station, a transfer station for transferring the eggs from a conveyor belt with a plurality of egg receivers arranged side by side into an egg pack, a pack closing station and an output station. The transfer station is designed according to the transfer device described above.

BRIEF DESCRIPTION OF THE DRAWING FIGURES

Figure 2:
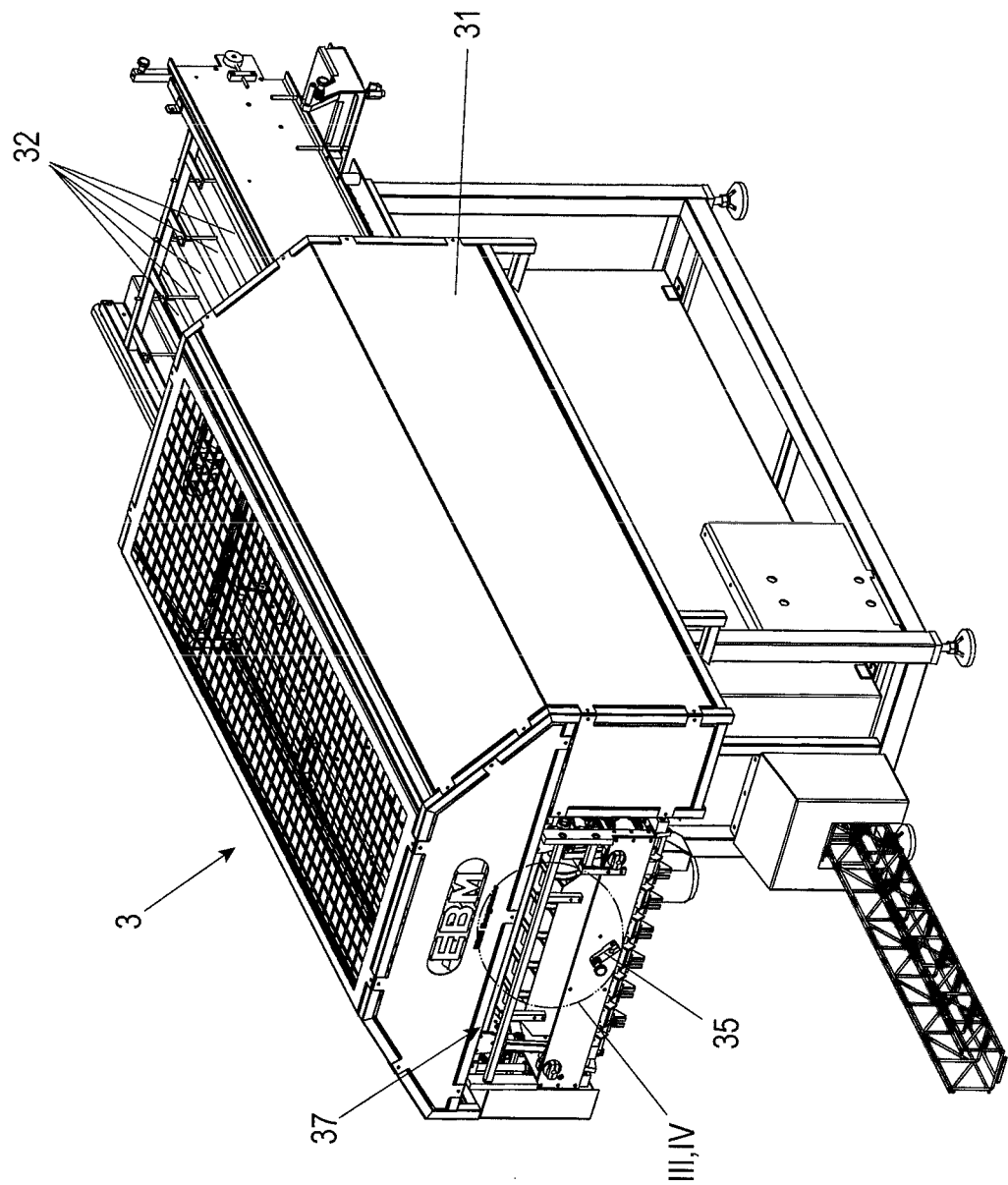
Figure 5:
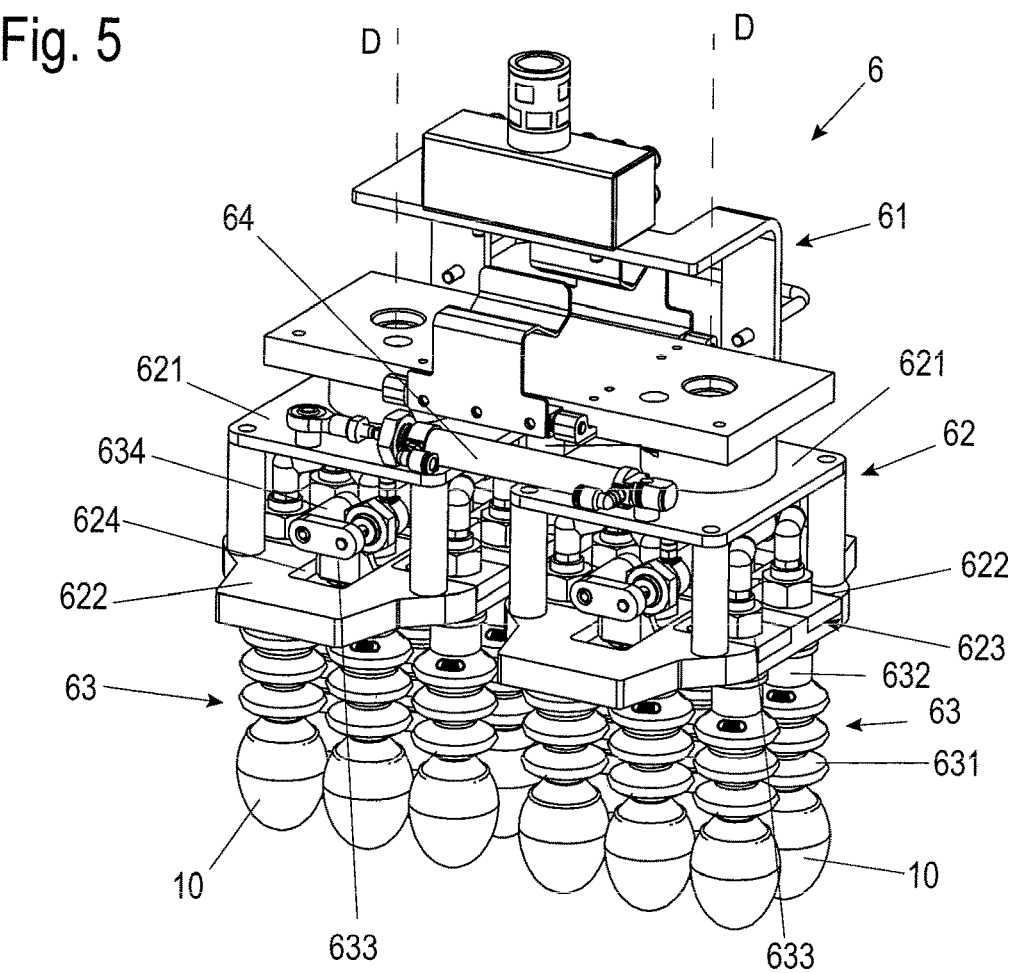
Figure 6:
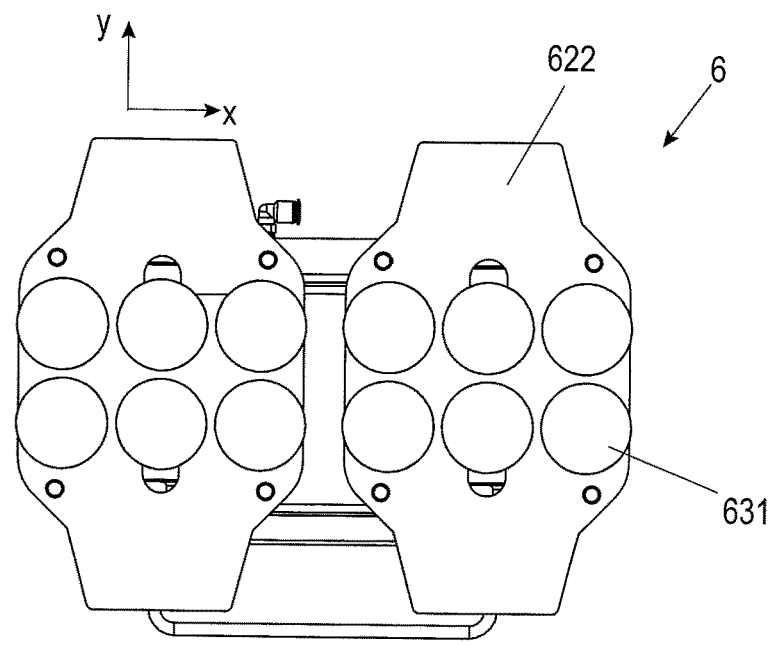
Figure 7:
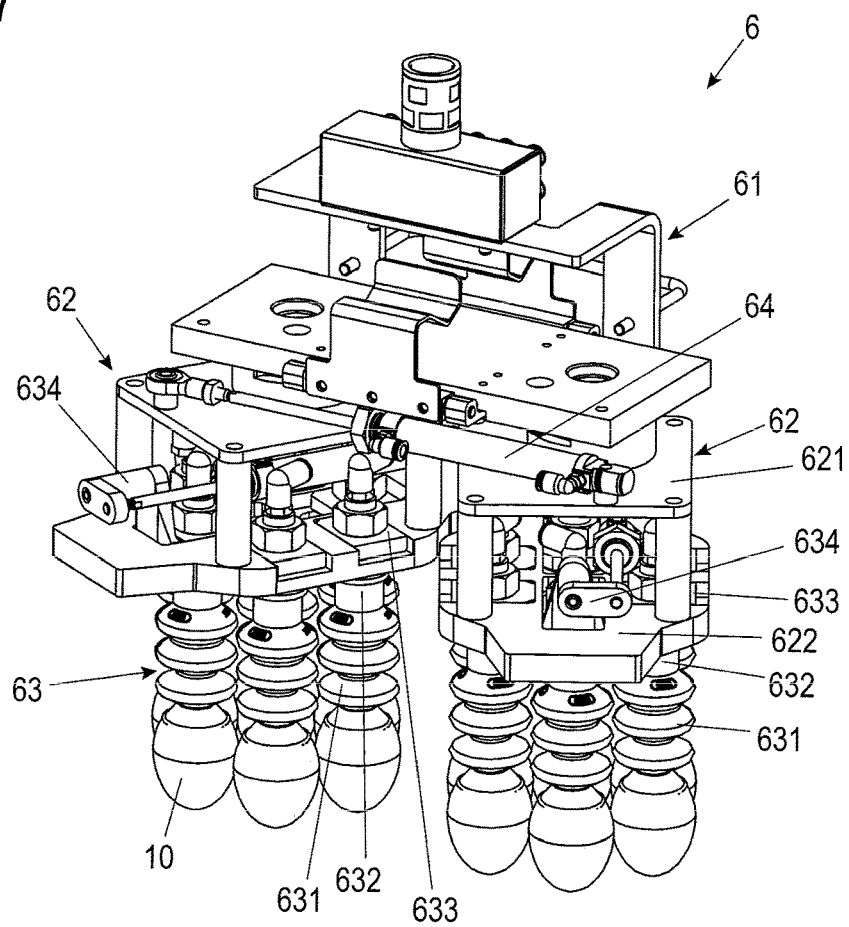
Figure 8:
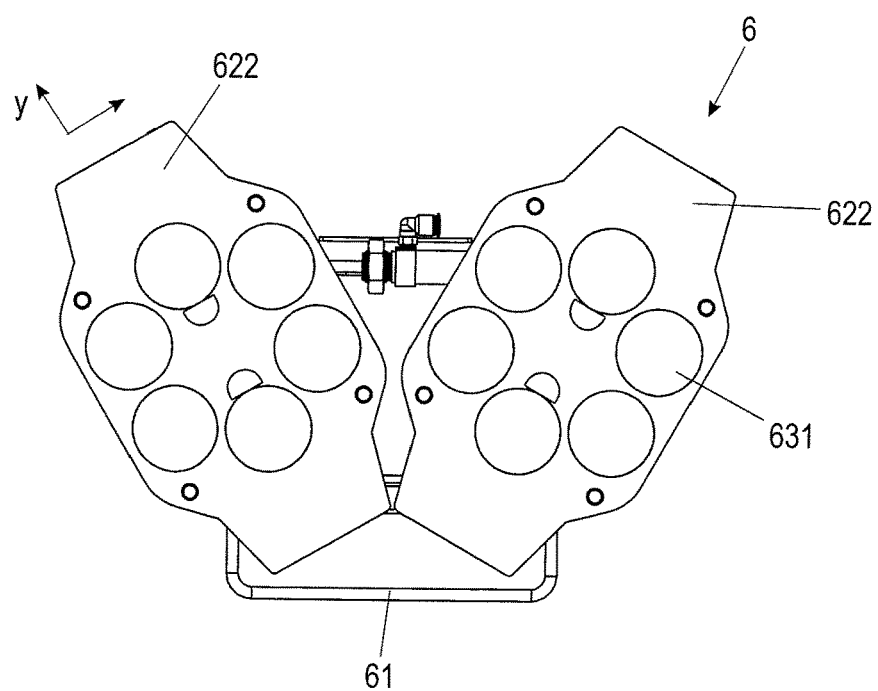
Figure 10:
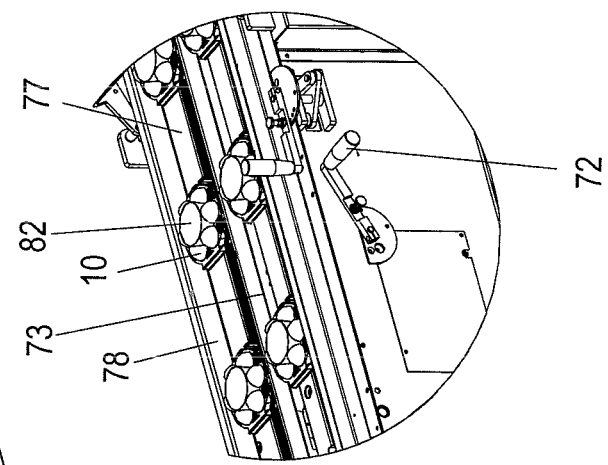
Figure 9:
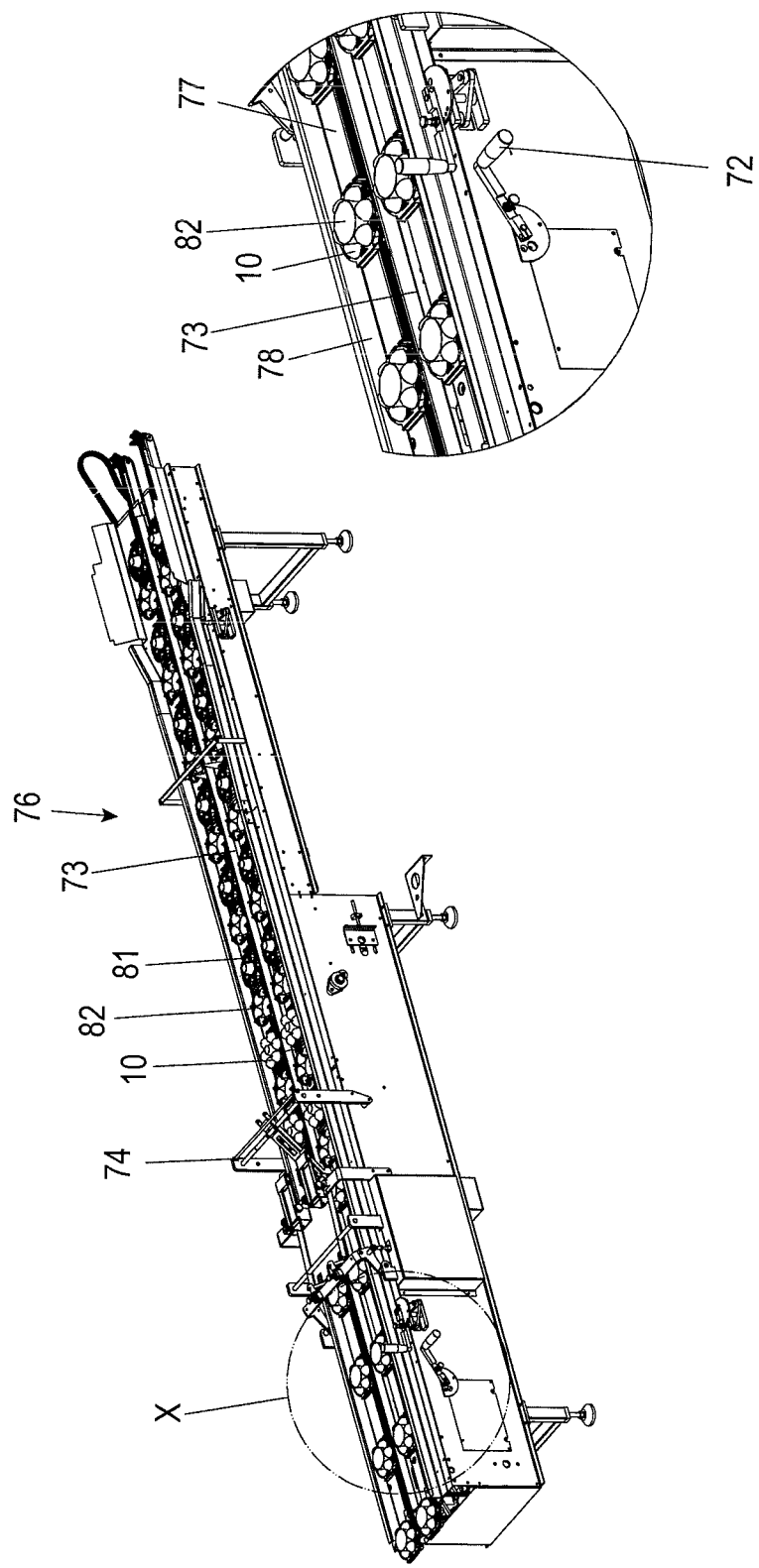
Figure 12:
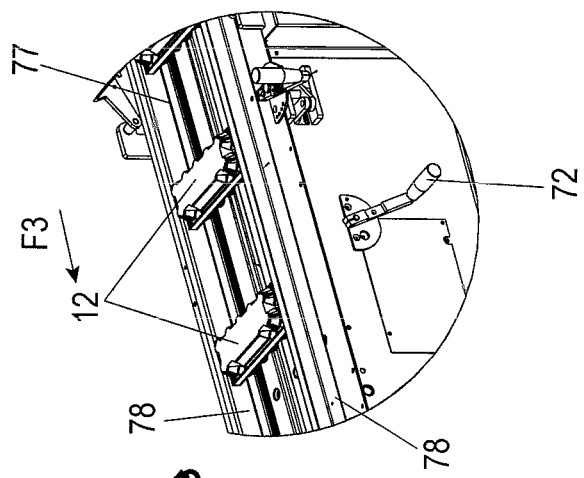
Figure 11:
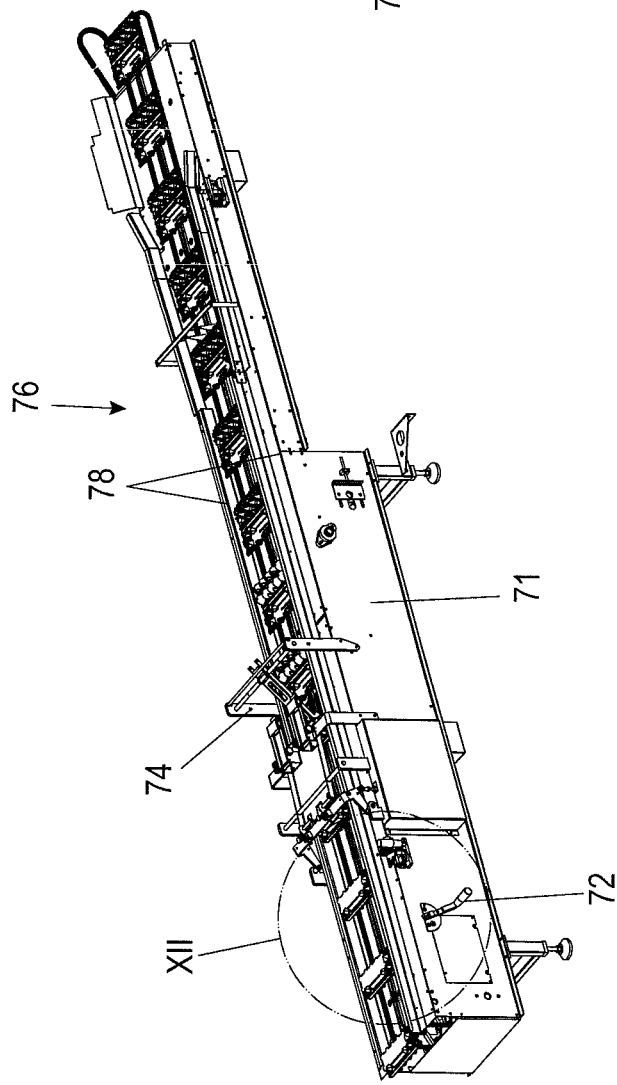

In the following, a preferred embodiment variant of the invention is explained in more detail using the enclosed drawings, wherein:

FIG. 1 shows a perspective representation of an embodiment variant of a device according to the invention for transporting and packaging eggs, FIG. 2 shows a detailed view of an egg alignment station, FIGS. 3 and 4 show in FIG. 2 a detail of the egg alignment station designated with III, IV in different alignment positions, FIG. 5 shows a detailed perspective view of an embodiment variant of a transfer device, FIG. 6 shows a view from below of the transfer device according to FIG. 5, FIG. 7 shows a detailed perspective representation of the transfer device from FIG. 5 in a star arrangement of the suction lifting elements, FIG. 8 shows a view from below of the transfer device according to FIG. 7, FIG. 9 shows a detailed perspective view of a pack closing station, FIG. 10 shows a detail section of the pack closing station with raised guide rail marked X in FIG. 9, and FIGS. 11 and 12 show views corresponding to FIGS. 9 and 10 of the pack closing station with lowered guide rail.

DETAILED DESCRIPTION

In the following figure description, terms such as top, bottom, left, right, front, back etc. refer exclusively to the exemplary representation and position of the transfer device, the conveyor belt, the egg packing, the egg alignment station, the destacking station, the pack closing station, the suction lifting elements and the like selected in the respective figures. These terms are not to be understood restrictively, i.e., these references can change due to different working positions or the mirror-symmetrical interpretation or the like.

Referring to FIG. 1, the reference numeral 1 denotes an embodiment variant of a device according to the invention for the transport and packing of eggs 10 in egg packs 8.

Device 1 has a feeding station for egg packs 8, which here is designed as two destacking stations 2, 4, which can be filled with different egg packs from each other.

The destacking station 2 is used for destacking double-row egg packs stacked on top of each other, in particular egg packs for 6, 10 or 12 eggs.

The double-row egg packs are guided via a fan belt 9 to a conveyor belt 75 leading to a pack closing station 7. The unpacking station 4 of the embodiment variant shown here is positioned in such a way that the egg packs 8 are placed directly on the conveyor belt 75.

The second destacking device 4 is used to destack star packagings for eggs stacked one on top of the other, wherein each of these packagings 8 are preferably designed to hold six eggs 10.

A feeding station for the eggs to be packed 10 is arranged parallel to the strand of the egg pack feeder. For this purpose, the eggs 10 are guided on a conveyor line 33 with several parallel running tracks 32 of an egg alignment station 3 in a conveying direction $F_1$.

From this egg alignment station 3, the eggs 10 are optionally inserted with the egg bottom 101 or the egg tip 102 in egg holders 51 of a first conveyor belt 5.

This first conveyor belt 5 serves to transport the eggs from the egg alignment station 3 in a conveying direction $F_2$ to a transfer device 6, which serves to transfer the eggs 10 from the conveyor belt 5 to the egg packs 8.

The egg packs 8 filled with eggs 10 are then conveyed further through a pack closing station 7, in which the egg packs 8 are closed from an open loading position, in which a pack lid 82, opened in the conveying direction $F_3$, is positioned in front of a pack bottom 81 of the egg packs 8 on the conveyor belt 75, by folding the pack lid 82 onto the respective pack bottom 81.

The egg pack 8 filled with eggs 10 is then transported to an output station 11.

Details of the egg alignment station 3 are shown in FIGS. 2 to 4.

As shown in FIGS. 2 to 4, the eggs 10 are guided lying on their side and rolling in the direction of a transfer area 37 after they have been laid on the tracks 32.

In this transfer area 37 an adjustment device 33 is arranged, with which the eggs 10 can be inserted either with the egg bottom 101 or the egg tip 102 into the respective egg holders 51 of the first conveyor belt 5.

The adjusting device 33 has a rod 332 extending transversely to the longitudinal tracks 32 and pivotally attached to a housing 31 of the egg alignment station 3, on which turning plates 331 aligned in conveying direction F are arranged.

The turning plates 331 are aligned in such a way that the eggs 10 abutting against the end edges of these turning plates 331 rotate as they continue to move in the conveying direction F so that the egg tip 102 faces forwards in the conveying direction F.

The distance between the turning plates 331 assigned to one of the tracks 32 is such that a channel is formed between two adjacent turning plates 331 which is smaller than the longitudinal extension of the eggs 10 but greater than the thickness of the eggs 10.

The eggs 10 are transported on conveyor rollers 38 in conveying direction F until they fall down via a chute 36 into the egg holders 51 of the first conveyor belt 5 arranged below the transfer area 37, in this case with the tip of the egg 102 facing downwards.

If the eggs 10 are to be inserted with their egg tip 102 upwards into the egg holders 51 of the conveyor belt 5, the adjusting device 33 is changed over in such a way that the turning plates 331 are taken out of engagement with the eggs 10 and instead a rail 39 with spring elements 34 extending in the direction of the eggs 10 is arranged, in particular pivoted, into the conveying path of the eggs 10. These spring elements 34, which preferably extend from the rail 39 in the direction of the transport rollers 38 and are designed as helical springs, are positioned in a direction transverse to the tracks 32 of the egg alignment station 3 in such a way that the eggs 10 are pushed over the rollers 38 during further transport in such a way that they align with the egg bottom 101 to the front in the conveying direction and thereby fall with the egg bottom 101 downwards over the chute 36 into the egg holders 51 of the conveyor belt 5.

The adjusting device is preferably actuated via an actuating lever 35. The actuating lever is coupled to the rail 39 and the rod 332 in such a way that by actuating, in particular pivoting, the actuating lever 35, which is movable relative to the housing 31 of the egg alignment station 3, the rod 332 with the turning plates 331 is pivoted into the conveying area of the eggs 10 and the rail 39 is simultaneously pivoted out of the conveying area of the eggs 10, or when actuating the actuating lever 35 in the opposite direction, the rod 332 with the turning plates 331 is pivoted out of the conveying area of the eggs 10 and the rail 39 is simultaneously pivoted into the conveying area of the eggs 10.

An adjustment controlled by an electric motor is also conceivable.

As shown in FIG. 1, the first conveyor belt 5 has several rows of egg holders 51 arranged in parallel. The conveying direction $F_2$ of the eggs 10 on the conveyor belt 5 is preferably perpendicular to the conveying direction $F_1$ of the eggs 10 along the egg alignment station 3. The conveyor belt 5 transports the eggs 10 to the transfer device 6.

The conveyor belt 5 is preferably mounted in such a way that it can be moved in the conveying direction $F_1$ under the transfer area 37 of the egg alignment station 3 in order to fill the rows of egg holders 51 arranged in parallel.

The conveyor belt 5 preferably consists of a revolving endless belt on which the egg deposits 51 are fixed.

In the transfer device 6, the eggs 10 are lifted by means of suction from the egg holders 51 using suction lifting elements 63 and inserted into the egg packs 8, which are transported towards the output station on a conveyor running underneath the transfer device 6.

The transfer device 6, which is preferably surrounded by grid walls 12 for protection, has essentially a vertically movable and horizontally displaceable or pivotable frame 61, shown in FIGS. 5 to 8, having at least one mounting plate 622 of a mounting element 62, on which several suction lifting elements 63 connectable to a suction device, such as a vacuum pump, are mounted.

These suction lifting elements 63 are mounted so as to be motively or hydraulically displaceable on the mounting plate 622 in the plane of the mounting plate 622 between a suction position and a delivery position.

As shown in FIGS. 5 and 7 and in the overview of FIGS. 5 to 8, six suction lifting elements 63 are preferably mounted on mounting plate 622.

Two of these suction lifting elements 63 can be moved linearly in a first displacement direction x and the other four of the suction lifting elements 63 can be moved in a second displacement direction y, preferably perpendicular to the displacement direction x.

This makes it possible to suck in the eggs 10 arranged in parallel rows on the egg holders 51 of the first conveyor belt 5 by placing the suction lifting elements 63 on the eggs 10, then to move the frame 61 to the delivery position and then to set it down in the respective egg pack 8 by switching off or interrupting the suction.

If the egg packs 8 are designed as double-row egg packs, the suction lifting elements 63 can remain in the suction position, since in this case, as shown in FIG. 6 for example, the eggs 10 are still held in double-row arrangement by the suction lifting elements 63.

If the eggs 10 are to be packed in a star arrangement in so-called star packs for eggs 10, the suction lifting elements 63 are moved accordingly into the position shown in FIGS. 7 and 8, so that the eggs 10 are arranged in a star arrangement corresponding to the star pack before loading the egg pack 8.

As further shown in FIGS. 5 to 8, two such mounting elements 62 are preferably mounted side by side on frame 61, which increases the capacity of this transfer device 6.

Each of the suction lifting elements 63 preferably has a suction cup 631, a piece of hose or pipe 632 opening into an upper end of the suction cup 631, which is connected to the suction device via a pipe or hose, and a guide part 633 connected to an adjusting mechanism 634. The guide parts 633 are displaceably guided in guide recesses 623, 624 of the mounting plate 622.

As further shown in FIG. 7, the mounting elements 62 can be pivoted around a rotary axis D aligned perpendicular to the mounting elements 62. It is also conceivable to arrange only one of the mounting elements 62 on the frame 61 so that it can be pivoted about such a rotary axis D.

After the eggs 10 are inserted into the respective bottoms 81 of egg packs 8, the egg packs 8 filled with eggs 10 are conveyed further to a pack closing station 7, in which the pack lids 82 arranged in conveying direction $F_3$ in front of the pack bottoms 81 are closed by folding down onto the pack bottoms 81 and are conveyed further to an output station 11.

For improved guidance of the egg packs 8, the pack closing station 7 has a liftable or lowerable guide rail 76 extending from a bottom of the conveyor belt in the conveying direction $F_3$, which serves to guide star packs or double-row six-packs, as shown in FIGS. 9 and 10.

These star packs or double-row six-packs are only about half as wide as the double-row twelve-packs that can also be used in the device for transporting and packaging eggs 10.

The twelve-egg packs are also preferably conveyed crosswise to the conveying direction $F_3$ on the conveyor belt 75. The guide rail 76 is retracted into the bottom 77 of the pack closing station 7, so that these egg packs 13 are guided by rails 78 at the edge.

The guide rail 76, which can be raised or lowered in the center of the bottom 77, is raised or lowered by means of a hand lever 72 in the embodiment variant shown here. An electromotive actuation of this rail 76 is also conceivable.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Device
2 Destacking station
3 Egg alignment station
31 Housing
32 Track
33 Adjusting device
331 Turning plate
332 Transverse rod
34 Spring element
35 Hand lever
36 Chute
37 Transfer area
38 Roller
39 Rail
4 Destacking station
5 Conveyor belt
51 Egg holder
52 Belt housing
6 Transfer device
61 Frame
62 Mounting element
621 Cover plate
622 Mounting plate
623 Guide recess
624 Guide recess
63 Suction lifting element
631 Suction cup
632 Hose or pipe piece
633 Guide part
634 Adjusting mechanism
7 Pack closing station
71 Belt housing
72 Hand lever
73 Guide rail
74 Folding rod assembly
75 Conveyor belt
76 Insert region
77 Base
78 Guide rail
8 Egg pack
81 Bottom
82 Lid
9 Fan belt
10 Egg
11 Output station
12 Egg pack
x Travel direction
Y Travel direction
$F_1$ Conveying direction
$F_2$ Conveying direction
$F_3$ Conveying direction

The invention claimed is:

1. A transfer device for transferring eggs from a conveyor belt into an egg pack, the transfer device comprising:
a frame that is vertically moveable and horizontally pivotable;
first and second mounting elements mounted side by side on the frame, wherein each of the first and second mounting elements include at least one mounting plate on which a plurality of suction lifting elements that are connectable to a suction device are mounted, wherein the plurality of suction lifting elements of the first and second mounting elements are mounted on the respective mounting plate in a plane of the respective mounting plate so that the plurality of suction lifting elements are motor-driven or hydraulically displaceable between a suction position and a delivery position, wherein the first and second mounting elements are pivotably mounted on the frame so that the first and second mounting element are pivotable about a respective rotary axis relative to the frame, wherein the respective rotary axis is aligned perpendicularly to the respective mounting element, wherein the respective mounting plates each have a longitudinal axis, wherein the longitudinal axis of the respective mounting plates runs along a longest dimension of the respective mounting plate, wherein, in the delivery position and depending on a configuration of eggs relative to each other in the egg pack, the first and second mounting elements and respective mounting plates are selectively configured in one of a first position in which the longitudinal axis of the respective mounting plates are parallel relative to each other and a second position in which the longitudinal axis of the respective mounting plates are non-perpendicular and not parallel relative to each other.

2. The transfer device of claim 1, wherein the plurality of suction lifting elements include six suction lifting elements mounted on the mounting plate, wherein two of the six suction lifting elements are movable linearly in a first displacement direction and the other four of the suction lifting elements are movable in a second displacement direction, which is different from the first displacement direction.

3. The transfer device of claim 2, wherein the six suction lifting elements are displaceable from a first position in which the six suction lifting elements are arranged in two rows parallel to one another into a second position in which the six suction lifting elements have a star arrangement corresponding to a star pack for eggs.

4. The transfer device of claim 1, wherein the mounting plate has guide recesses configured to accommodate guide parts of the plurality of suction lifting elements, and the guide parts are configured to be displaceably guided.

5. The transfer device of claim 1, wherein each of the plurality of suction lifting elements comprises a suction cup, a piece of hose or pipe opening into an upper end of the suction cup, and a guide part connected to an adjusting mechanism.

6. The transfer device of claim 1, wherein, in the suction position, the mounting element is configured in the first position relative to the rotary axis.

7. The transfer device of claim 6, wherein
the plurality of suction lifting elements are configured in a first arrangement in the suction position, and
the plurality of suction lifting elements are selectively configured in one of the first arrangement and a second arrangement in the delivery position depending on the configuration of the egg pack,
the first and second arrangements of the plurality of suction lifting elements are different.

8. The transfer device of claim 1, wherein the first and second mounting elements are rotatable in different directions.

9. A device for transporting and packaging eggs in egg packs, the device comprising:
at least one destacking station for empty egg packs;
an egg alignment station;
a transfer station for transferring the eggs from a conveyor belt with a plurality of egg holders arranged next to one another into an egg pack;
a pack closing station; and
an output station,
wherein the transfer station includes a transfer device comprising
a frame that is vertically moveable and horizontally pivotable;
first and second mounting elements mounted side by side on the frame, wherein each of the first and second mounting elements include at least one mounting plate on which a plurality of suction lifting elements that are connectable to a suction device are mounted,
wherein the plurality of suction lifting elements of the first and second mounting elements are mounted on the respective mounting plate in a plane of the mounting plate so that the plurality of suction lifting elements are motor-driven or hydraulically displaceable between a suction position and a delivery position,
wherein the first and second mounting elements are pivotably mounted on the frame so that the first and second mounting elements are pivotable about a respective rotary axis relative to the frame, wherein the respective rotary axis is aligned perpendicularly to the mounting element,
wherein the respective mounting plates each have a longitudinal axis, wherein the longitudinal axis of the respective mounting plates runs along a longest dimension of the respective mounting plate, and
wherein, in the delivery position and depending on a configuration of eggs relative to each other in the egg packs, the first and second mounting elements and respective mounting plates are selectively configured in one of a first position in which the longitudinal axis of the respective mounting plates are parallel relative to each other and a second position in which the longitudinal axis of the respective mounting plates are non-perpendicular and not parallel relative to each other.

10. The device of claim 9, wherein, in the suction position, the mounting element is configured in the first position relative to the rotary axis.

11. The device of claim 10, wherein
the plurality of suction lifting elements are configured in a first arrangement in the suction position, and
the plurality of suction lifting elements are selectively configured in one of the first arrangement and a second arrangement in the delivery position depending on the configuration of the egg pack,
the first and second arrangements of the plurality of suction lifting elements are different.

12. The device of claim 9, wherein the first and second mounting elements are rotatable in different directions.

* * * * *